(No Model.)
R. MIEHLE.
AIR CUSHIONING APPARATUS.
No. 559,589. Patented May 5, 1896.
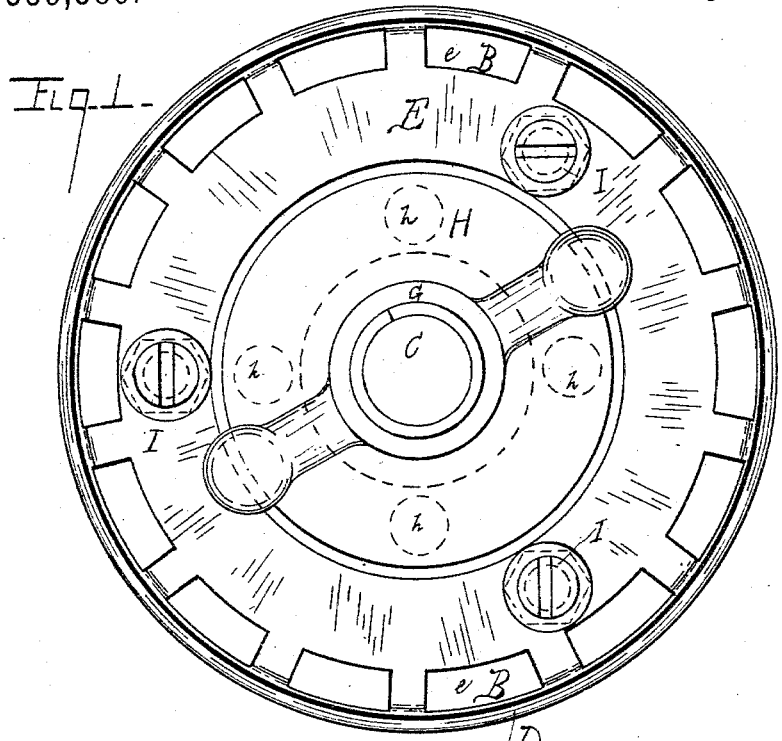
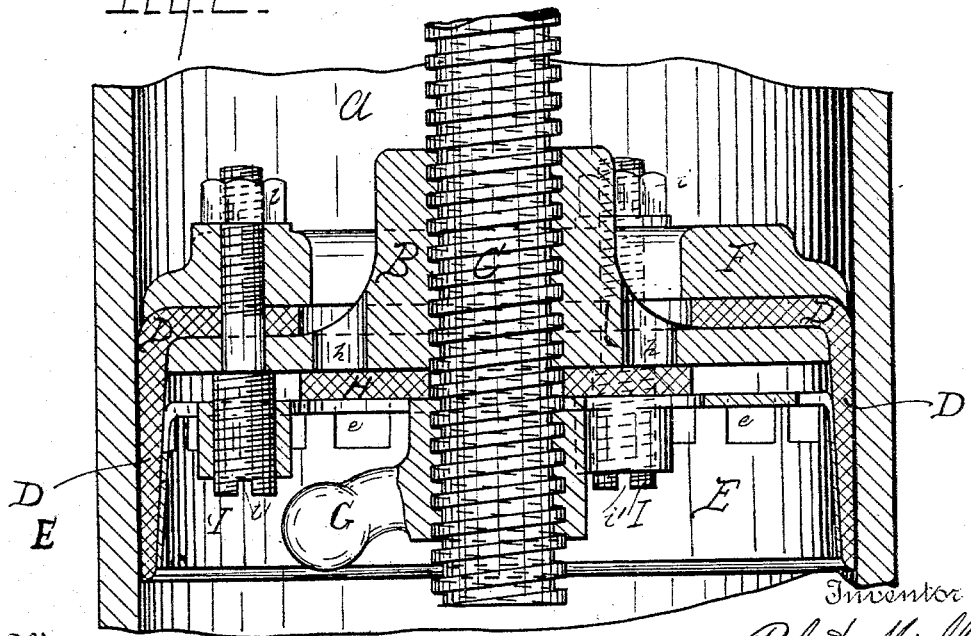
Witnesses
W. M. Moore
Chas. B. Dwett
Inventor
Robert Miehle.

UNITED STATES PATENT OFFICE.

ROBERT MIEHLE, OF CHICAGO, ILLINOIS, ASSIGNOR, BY MESNE ASSIGN-MENTS, TO THE MIEHLE PRINTING PRESS AND MANUFACTURING COMPANY, OF SAME PLACE.

AIR-CUSHIONING APPARATUS.

SPECIFICATION forming part of Letters Patent No. 559,589, dated May 5, 1896.

Application filed June 2, 1890. Serial No. 353,936. (No model.)

*To all whom it may concern:*

Be it known that I, ROBERT MIEHLE, a citizen of the United States, residing at Chicago, in the county of Cook and State of Illinois, have invented a certain new and useful Improvement in Air-Cushioning Apparatus, which is fully set forth in the following specification, reference being had to the accompanying drawings.

This invention relates to air-cushioning apparatus of that kind consisting of a cylinder and piston such as is used in printing-presses and other machines to overcome the momentum of heavy moving parts.

The invention consists in the matters hereinafter described, and pointed out in the appended claim.

In the accompanying drawings, illustrating my invention, Figure 1 is a face view of the piston. Fig. 2 is a sectional view of the same, showing a portion of the cylinder within which it moves.

As shown in said drawings, A designates the air-cylinder, which is of the usual form and which may be secured either to the frame of the machine or to the moving part, and B the piston, which is attached to a piston-rod C, which latter is usually secured by means of a bracket to the frame or moving part of the machine. The piston B is herein shown as attached to the piston-rod by means of a screw-thread on the rod engaging a corresponding thread on the piston.

D is a packing-ring, of leather or other suitable flexible material, which is secured to the outer edge of the piston, and is made cylindric on its outer surface to fit the interior of the cylinder and tapered or conical on its inner surface. E is a metal expander having the form of a ring or annulus and provided with an external conical or tapered surface corresponding with the interior conical surface of the packing-ring, said expander being located within the ring in the manner shown. Said packing-ring is provided with an inwardly-extending flange, which overlaps the flat face of the piston and is secured to the latter by means of a clamping-ring F. The expander is adapted to be drawn into the packing-ring and toward the piston-head, so as to expand the packing-ring against the cylinder with greater or less pressure, as desired, and for this purpose means are provided for drawing the expander into the ring and for holding it rigidly in position, such devices being made as follows: I I are a series of screws which have screw-threaded engagement with the expander and which pass through the piston and the clamping-ring F, said screws being adapted to turn within the piston and clamping-ring without endwise movement to permit adjustment of the expander. For this purpose the said screws are made with reduced cylindric portions, which pass loosely through the piston and clamping-ring and by which are formed shoulders which bear against the surface of the piston, said cylindric parts being screw-threaded at their outer ends and provided with nuts $i\ i$, which bear against the clamping-ring F, so as to hold said clamping-ring against the packing-ring and at the same time hold the adjusting-screws I from endwise movement in one direction. Said screws are provided at their ends which pass through the expander with slots $i'$, by which the screws may be turned to move the expander toward or from the piston B.

In the particular construction shown the expander is made cup-shaped, so that its outer conical bearing-surface is formed by means of a deep conical wall or flange which acts upon the inner surface of the packing-ring throughout the greater part of the width of the latter. The adjusting-screws I I in this construction pass through the inwardly-extending or flat portion of the ring-shaped expander, and, the same being made relatively thin, reinforcing projections or hubs are formed upon the expander, within which are formed the screw-threaded apertures to receive the adjusting-screws I I.

In the outer or conical part or wall of the expander I provide a series of openings $e\ e$, which allow access of air to the inner surface of the packing-ring, so that air-pressure may come upon the said ring to force the same outward against the wall of the cylinder.

An air-valve for allowing inflow of air through the piston when the latter is drawn backwardly out of the cylinder is provided as follows: In the piston B, around the piston-rod and between the same and the inner edge of the flange of the packing-ring, are formed a series of apertures $h\ h$.

H is a valve-disk of flexible material, such as leather or rubber, which is provided with a central aperture for the passage of the piston-rod, and is secured against the face of the piston with its margins overlapping the apertures $h\ h$ by means of a nut G upon the piston-rod. Said washer may be made of thin metal or other material than those mentioned. Said valve-disk and the apertures $h\ h$ constitute an air-valve by which air is admitted to the cylinder in the outward stroke of the piston in the usual manner.

I claim as my invention—

The combination with an air-cylinder and piston and a piston-rod attached to the piston, of an annular packing-ring extending around the periphery of the piston and provided with an inwardly-extending flange which overlaps the rear face of the piston, said ring being cylindric on its outer surface and conical on its inner surface, a clamping-ring the inner diameter of which is larger than the hub of the piston for holding the flange against the piston, an air-valve consisting of apertures extending through the piston between the said hub and said clamping-ring, a valve-disk secured centrally to the piston on its outer face covering the apertures therein, an annular conical expander located within the packing-ring and adjusting-screws for the expander which also hold the clamping-ring in contact with the packing-ring, said screws having screw-threaded engagement with the expander and being provided with shoulders which bear against the piston and with nuts which bear against the clamping-ring, substantially as described.

In testimony whereof I affix my signature in presence of two witnesses.

ROBERT MIEHLE.

Witnesses:
W. M. MORSE,
CHAS. B. SWETT.